United States Patent Office 3,240,825
Patented Mar. 15, 1966

3,240,825
HOMOTELOMERS OF 2,3,3,3-TETRAFLUOROPRO-PENE-1 AND METHOD FOR MAKING SAME
Murray Hauptschein, Glenside, Pa., Milton Braid, Haddon Heights, N.J., and Francis Lawlor, Torrance, Calif., assignors to Pennsalt Chemicals Corporation, Philadelphia, Pa., a corporation of Pennsylvania
No Drawing. Filed Jan. 14, 1963, Ser. No. 251,073
13 Claims. (Cl. 260—653.1)

This application is a continuation-in-part of our copending application Serial No. 701,995, filed December 11, 1957, which is itself a continuation-in-part of our application Serial No. 614,821, filed October 9, 1956, and now abandoned. Said application Serial No. 701,995 has now become Patent No. 3,083,238.

This invention relates to a new method for producing polymers of 2,3,3,3-tetrafluoropropene-1 and to novel polymeric products made thereby.

In recent years, interest in fluorine containing polymeric materials has been intense. Basically, highly fluorinated polymeric materials are desirable because they are more stable to heat and chemical reagents then similar, non-fluorinated materials. Fluorinated polymers have been used in many different applications where high heat or chemical resistance is required, for example, as dielectrics, fire extinguishers, heat transfer media, solvents, lubricants, plasticizers, coolants, gaskets and valve packings, and protective coatings.

One of the obstacles to the more extensive use of fluoropolymers has been that they are difficult and expensive to prepare. Many potentially attractive fluorocarbon monomers polymerize only under very rigorous conditions or only to a slight extent, e.g. to the dimer or trimer. With still others, it has not been possible to obtain any polymerization at all.

It has been proposed to overcome this difficulty by copolymerizing difficultly polymerizable monomers with monomers known to polymerize more readily. Thus, perfluoropropene has been copolymerized with ethylenically unsaturated hydrocarbons. In such copolymerization reactions, however, extraneous molecules are introduced into the polymer chain, so that all the properties of the homopolymer are not realized.

It has also been attempted to use the "telomerization" technique to achieve polymeric fluorocarbons. Thus Haszeldine (Journal of the Chemical Society 3559 [1953]) describes a classic telomerization reaction between $CF_3I$ and $CF_2=CF_2$ to give $CF_3(CF_2CF_2)_nI$ where $n$ may be a high as 20. This telomerization reaction is said to build up large molecules by the following rapid chain reaction mechanism.

(1) $CF_3I \xrightarrow{\text{heat or light}} CF_3\cdot + I$ (2) $CF_3\cdot + CF_2=CF_2 \rightarrow CF_3-CF_2-CF_2$ (3) $CF_3-CF_2-CF_2\cdot +_n(CF_2=CF_2)$
$\rightarrow CF_3(CF_2-CF_2)_{n+1}$ In this mechanism the telomer chain is built up by almost instantaneous reaction between the growing telomer radical and successive molecules of olefin. The molecular size of the final product is in general independent of the time of reaction, but rather is dependent on the probability of a growing telomer radical meeting and reacting with a telogen molecule to effect chain termination, and therefore on the proportions of olefin and telogen used.

The particular reaction referred to above gave relatively high telomers of tetrafluoroethylene, but when an attempt was made to apply it to more difficultly polymerizable monomers, using ultra-violet light as the initiating agency, no telomers were obtained having more than 2 olefin units.

From these facts it could be concluded that with certain classes of unsaturated fluorinated compounds, namely with those compounds which would not readily undergo homopolymerization, telomers having more than about two units could not be formed. Attempts to force the telomer to accept more units were thought inevitably to lead to disproportionation, dimerization or internal expulsion of halogen.

It has now been found that telomers of the compound 2,3,3,3-tetrafluoropropene-1, $CH_2=CFCF_3$, an olefin hitherto considered to be impossible to polymerize or telomerize can be formed. Telomeric products in accordance with the invention may have the formula $$R[CH_2CFCF_3]_nX$$

where R is a telogen residue to be further defined below, X is halogen, and $n$ is a number from 1 to say 20.

Telomers in accordance with the invention may be made by heating $CH_2=CFCF_3$ with a telogen having the formula $$RQ$$

where R is selected from the group consisting of perfluoroalkyl, perfluorocycloalkyl and perfluoroalkenyl radicals; and perfluorochloroalkyl, perfluorohydroalkyl, perfluorochlorocycloalkyl, perfluorohydrocycloalkyl, perfluorochloroalkenyl and perfluorohydroalkenyl radicals in which the carbon atom which is attached to the Q atom has at least one substituent selected from the group consisting of halogen, perfluoroalkyl radicals and $R'CF_2-$ radicals where R' is selected from the group consisting of perfluorochloroalkyl and perfluorohydroalkyl radicals and Q is bromine or iodine. The initial products, having the formula $$R[CH_2CFCF_3]_nQ$$

can be converted to the corresponding chloride or fluoride by known techniques, as described more fully below.

As used in the present specification, the prefix "perfluoro" means that the compound so described contains nothing but carbon and fluorine.

The term "perfluorochloro" means that the compound so described contains only carbon, fluorine and chlorine and that the molar ratio of fluorine to chlorine is at least 1.

The term "perfluorohydro" means that the compound so described contains only carbon, hydrogen, and fluorine and that the molar ratio, fluorine to hydrogen is at least 1.

The mechanism of the reaction defined above is different from that postulated previously in connection with the telomerization of tetrafluoroethylene. Instead of chain propagation taking place through reaction between a growing telomer radical and successive molecules of olefin, as in reaction (3) above, step-wise addition takes place with the telomeric iodo- or bromo-compound being formed in each case.

In the present case, even in the presence of very large excesses of olefin, no evidence of free radical chain propagation is obtained, since after a short time the only product isolated is the 1:1 adduct. The 1:1 adduct is thus the precursor of the 2:1 adduct which in turn in the precursor of the 3:1 adduct, etc., etc.

This is illustrated in the reaction of perfluoro propyl iodide (4) $C_3F_7I+CH_2=CFCF_3 \rightarrow C_3F_7CH_2CF(CF_3)I$ (5) $C_3F_7CH_2CF(CF_3)I+CH_2=CFCF_3 \rightarrow$
$C_3F_7[CH_2CF(CF_3)]_2I$ (6) $C_3F_7[CH_2CF(CF_3)]_nI+CH_2=CFCF_3 \rightarrow$
$C_3F_7[CH_2CF(CF_3)]_{n+1}I$ The maintenance of an energy level sufficiently high to promote and sustain the reaction is no doubt one of the principal reasons why telomers of $CH_2=CFCF_3$ can be produced at appreciable rates by thermal synthesis in accordance with the present invention.

The telogens which may be used in the present invention include such specific compounds as $CF_3I$, $C_3F_7I$, $CF_3Br$, $C_4F_9CF(CF_3)I$, $C_4F_9CF(CF_3)Br$, $$C_4F_9CF(CF_3)CF_2CF(CF_3)I$$

$CF_2ClCHClI$, $CF_3CFICF_2I$, $CF_2ICF_2CF_2I$, $CF_2ICF_2I$, $CF_2Br_2$, $CF_2ClBr$, $(CF_3)_2CFBr$, $CF_2BrCFBrCH_3$, $CF_2ClCFClI$, $CF_3CFICF_2Cl$, $CF_3CFICF_3$, $CF_2=CFI$, $CF_2=CFCF_2I$, $CF_2=CFBf$, $CF_2=CHCF_2I$,

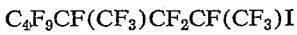

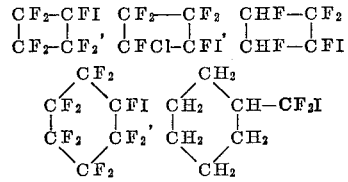

$(C_6H_5)CF_2I$, $CF_3CHClI$, $CF_2ClCHClI$, $C_6H_5CF_2CHClI$, $Cl(C_6H_4)CFClCHClI$, $(C_6H_{11})CF(CF_3)C(CF_3)ClI$, $CFCl=CF_2CF_2I$, $CHF=CF_2CF_2I$, $Cl(C_6H_4)CF_2I$, $CH_3(C_6H_4)CF_2I$, $CH_2Cl(C_6H_4)CF_2I$, $C_3H_7CF(CF_3)I$, $C_3F_7CHBrI$, and $C_4H_9CHClCF_2CHClI$.

In some cases the telogen may be formed in situ, by the addition of, for example, $I_2$, $ICl$, or $Br_2$ to the unsaturated compound.

In general, the iodo compounds are preferred over the corresponding bromo compounds.

The reaction conditions will vary to some extent, depending on the particular telogen and the type of product desired.

The temperature should in general be between about 100° C. and about 350° C., preferably between about 160 and about 250° C. The reaction may be carried out at atmospheric pressure, but preferably high pressures are used, for example, up to about 20,000 p.s.i.g., usually between about 500 p.s.i.g. and about 10,000 p.s.i.g.

With respect to the proportions of telogen and unsaturated compound used, for maximum yields of any desired telomer it is always necessary to use at least the stoichiometric amount of olefin required by the telomer it is desired to produce, over the entire period of the reaction. Moreover, considered at any instant of time, it is preferred to have at least an equimolar amount of unsaturated compound present. Preferably the proportion of unsaturated compound is between about 2 and about 20 times the molar amount of telogen and usually between about 2 and about 10 times the molar amount of telogen.

The reaction time is not critical in the sense that it determines whether or not the reaction will go, but it is an important variable in determining the conversion obtained and the molecular size of the product. Since the reaction proceeds stepwise, i.e. the 1:1 adduct reacts with additional unsaturated compound to form the 1:2 adduct and so on, the reaction time for any desired chain length must be sufficient to permit the precursors to form and react. In general, the longer the reaction time, the greater the proportion of high molecular weight product obtained, and when a short reaction time is used, only low molecular weight product is obtained. In this the present process is clearly different from conventional telomerizations proceeding by free radical chain mechanism in which the chain length is determined primarily by the proportion of telogen or chain transfer agent used. Thus in prior art processes when an excess of olefin is present only high molecular weight products are obtained even with short reaction times.

In the present process the specific reaction time will depend on the particular reactants and on the efficiency of contact between them. In general, it will be from about 3 hours to 3–4 weeks, preferably from about 6 hours to 2 weeks.

Telomers made according to the invention will undergo a variety of other reactions. In many cases, for example, it is desirable to replace the Q atom (Br or I) with chlorine or fluorine to enhance the stability of the telomer. These replacements may be carried out by any conventional method, for example by reaction with elemental chlorine at a pressure of say atmospheric to 10,000 p.s.i.g. and at a temperature of say room temperature of 270° C.; or by reaction with cobalt trifluoride at a temperature of say 100 to 270° C.

Telomers made according to the present invention may also be stabilized by heating them at a temperature somewhat higher, e.g. 50–200° higher, than the optimum temperature used in the formation of the telomer, for example, at 200–550° C. By this procedure, the Q atom (Br or I) is removed, as $Q_2$, and the stabilized products include coupled telomers of the general type

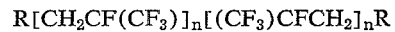

Coupled products of this general class and the general methods for their manufacture are described in the copending application of R. N. Haszeldine, Serial No. 179,217, filed March 12, 1962; and in Patent No. 3,046,304 of R. N. Hazeldine. Application Serial No. 179,217 is a continuation of application Serial No. 680,924, filed August 29, 1957 which in turn was a continuation-in-part of application Serial No. 526,087, filed August 2, 1955, and application Serial No. 377,716, filed August 31, 1953. Application Serial No. 680,924, 526,087 and 377,716 have all now been abandoned.

In general, it may be said that the compounds of the present invention are suitable for the same applications in which similar, non-fluorinated compounds are employed, with the added advantage that the fluorinated compounds have in general higher stability to heat and chemical attack. In addition, compounds of the present invention may be used in many instances where there is no parallel use of non-fluorinated analogues.

Those products which are oils provide superior hydraulic fluids and permanent lubricants for instruments. They are useful in the laboratory as stopcock lubricants. Their chemical and thermal stability makes them excellent heat transfer media and refrigerants. They can also be used to advantage as damping fluids in shock absorbers and the like.

In certain cases they can be used as plasticizers for fluoropolymers.

The lower telomers, i.e. where $n$ is 1 and 2, are valuable as vapor phase coolants and dielectrics for electrical equipment and as vapor phase coolants in processes where leaks in a coolant system would case violent reactions if ordinary organic coolants were used. They are also useful as temperature differential fluids in thermometric devices.

The invention will be further described with reference to the following specific examples, it being understood that the examples are given for purposes of illustration only and are not to be taken as in any way restricting the invention beyond the scope of the appended claims.

*Example I*

A Monel autoclave is charged with 65.0 g. of 1-iodoperfluoropropane, and 95 g. of 2,3,3,3-tetrafluoropropene-1 ($CF_3CF=CH_2$) is then added by vacuum transfer. The autoclave is heated with shaking at 187–190° C. for 89 hours. The pressure falls from 1100 p.s.i. at the outset to 150 p.s.i. at the end of the run. There are recovered 45 g. of the tetrafluoropropene and 15.9 of 1- iodoperfluoropropane. The total of 88.2 g. of product, $C_3F_7[CH_2CF(CF_3)]_nI$ wherein $n$ is 1–10 av., is separated into various fractions by rectification. The lower boiling fractions (ca. 33 g.) boil mostly at 80–122° C. at 18 mm. The higher boiling fractions are:

(a) 12 g.—B.P., 84–104° C. (0.1 mm.), $n_D^{25}=1.3503$ ($n=4$ av.)

(b) 7.8 g.—B.P., 104–110° C. (0.1 mm.), $n_D^{25}=1.3518$ ($n=5$ av.)

(c) 13.7 g.—B.P., 122–137° C. (<0.1 mm.), $n_D^{25}=1.3502$ ($n=7$ av.)

(d) 7.2 g.—B.P., 137–170° C. (<0.1 mm.), $n_D^{38.5}=1.3522$ ($n=9$ av.)

(e) 2.5 g. residue

Fractions (a) to (d) range from a light oil to a very heavy oil. For example, fraction (b) has a viscosity of 25° C. of 200.7 centistokes. Residue (e) is a solid.

The ultra-violet spectra maxima in isooctane are mostly at 272–274 mμ. The infra-red spectra of all of the samples are nearly identical. They all have bands at 3.3μ (C–H stretching). Strong bands are present at 7.4–9.0μ (C–F stretching), 10.8μ, 12.6μ and a doublet, 13.48 and 13.65μ.

*Example II*

A Monel autoclave is charged with $CF_3I$ and $CH_2=CFCF_3$, the molar proportion of olefin to iodide being about 4:1. It is then heated with shaking at about 190° C. for 5 days. The products $CF_3[CH_2CF(CF_3)]_nI$ comprises a series of fractions, $n=1–10$ av., boiling up to 190° C. at ca. 0.1 mm.

*Example III*

Four molar proportions of $CH_2=CFCF_3$ and one of $CF_3CFICF_2Cl$ are heated in a Monel autoclave at about 190° C. for three days. The liquid product is an oil, $CF_3CF(CF_2Cl)[CH_2CF(CF_3)]_nI$ where $n=1–10$ av. The fraction where $n=3–10$ has a boiling point range of about 100 to 200° C. at ca. 0.1 mm.

*Example IV*

A telomer iodide having the formula $$C_3C_7[CH_2CF(CF_3)]_{5av.}I$$

prepared in accordance with Example I is heated to 150° C. and metered drop by drop (while excluding oxygen) downwardly into the top of a vertical glass tube packed with glass helices and evenly heated to a temperature of 150–160° C. An excess of chlorine preheated to 150° C. is passed into the top of the column and flows downwardly concurrently with the liquid iodide. The liquid telomer chloride, $C_3F_7[CH_2CF(CF_3)]_{5av.}Cl$, is recovered from the bottom of the column.

*Example V*

A telomer iodide having the formula $$C_3F_7[CH_2CF(CF_3)]_{4av.}I$$

prepared as described in Example I is heated with a slight molar excess of $SbF_3Cl_2$ in a trichlorothrifluoroethane solvent in a stainless steel auotclave at 100° C. for two hours. The crude fluorinated product is distilled to give the telomer $C_3F_7[CH_2CF(CF_3)]_{4av.}F$.

*Example VI*

Four molar proportions of $C_2F_5I$ are heated with stirring with one molar proportion of $CH_2=CFCF_3$ at 190° C. for four days. The product $C_2F_5[CH_2CF(CF_3)]_{1-10}I$ is formed.

The products $R[CH_2CF(CF_3)]_nX$, where $n$ is greater than 2, comprise a series of oils which are valuable as lubricants under condtitions where stability to temperature and chemical attack are required. The presence of —$CH_2$—groups in the chain imparts a better temperature/viscosity slope than is found with telomers of, e.g. $CF_3CF=CF_2$. That is to say, the viscosity of a given oil based on a —$[CH_2CF_2(CF_3)]_n$— chain ($n$ being greater than 2) changes less with temperature than does an oil based on a —$CF_2CF(CF_3)$— chain of comparable chain length. Presumably this is because the —$CH_2$— groups permit rotation of the molecule to a greater extent than the more bulky —$CF_2$— groups. At the same time the branched structure resulting from the —$CF_3$ side chain imparts a greater liquidus range than would be obtained, for example, from vinylidene fluoride ($CH_2=CF_2$) polymers and telomers. This means that telomers of $CH_2=CF(CF_3)$ tend to be liquids over a greater range of molecular weight than telomers based on —$CH_2CF_2$—, having the same end groups, giving the lubricant user a greater choice in selecting a compound capable of meeting his precise requirements.

What is claimed is:

1. Fluorine containing organic compounds having the formula $$R[CH_2CF(CF_3)]_nX$$

where X is halogen, $n$ is an integer from 1 to 20, inclusive and R is selected from the group consisting of perfluoroalkyl, perfluorocycloalkyl and perfluoroalkenyl radicals, and perfluorochloroalkyl, perfluorohydroalkyl, perfluorochlorocycloalkyl, perfluorochloroalkenyl and perfluorohydroalkenyl radicals in which the carbon atom which is attached to the X atom has at least one substituent selected from the group consisting of halogen, perfluoroalkyl radicals and R′$CF_2$- radicals where R′ is selected from the group consisting of perfluorochloroalkyl and perfluorohydroalkyl radicals.

2. The products claimed in claim 1 where R is perfluoroalkyl.

3. Polymeric products having the formula $$C_3F_7[CH_2CF(CF_3)]_nX$$

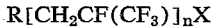

where X is halogen and $n$ is an integer from 1 to 20, inclusive.

4. Polymeric products having the formula $$C_2F_5[CH_2CF(CF_3)]_nX$$

where X is halogen and $n$ is an integer from 1 to 20, inclusive.

5. Polymeric products having the formula $$CF_3[CH_2CF(CF_3)]_nX$$

where X is halogen and $n$ is an integer from 1 to 20, inclusive.

6. Polymeric products having the formula $$CF_3CF(CF_2Cl)[CH_2CF(CF_3)]_nX$$

where X is halogen and $n$ is an integer from 1 to 20, inclusive.

7. A method of making fluorine containing organic compounds which comprises heating at a temperature of between about 100° C. and about 350° C. a telogen having the formula $$RQ$$

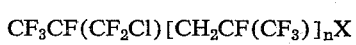

where R is selected from the group consisting of perfluoroalkyl, perfluorocycloalkyl and perfluoroalkenyl radicals, and perfluorochloroalkyl, perfluorohydroalkyl, perfluorochlorocycloalkyl, perfluorochloroalkenyl and perfluorohydroalkenyl radicals in which the carbon atom which is attached to the Q atom has at least one substituent selected from the group consiting of halogen, perfluoroalkyl radicals and R′$CF_2$- radicals where R′ is selected from the group consisting of perfluorochloroalkyl and perfluorohydroalkyl radicals, and Q is selected from the group consisting of bromine and iodine, with 2,3,3,3-tetrafluoropropene-1.

8. The method claimed in claim 7 wherein the molar ratio of 2,3,3,3-tetrafluoropropene-1 to telogen is between about 2:1 and about 20:1.

9. The method claimed in claim 7 wherein R is a perfluoroalkyl group.

10. The method claimed in claim 7 wherein the telogen is $CF_3I$.

11. The method claimed in claim 7 wherein the telogen is $C_2F_5I$.

12. The method claimed in claim 7 wherein the telogen is $C_3F_7I$.

13. The method claimed in claim 7 wherein the telogen is $CF_3CFICF_2Cl$.

References Cited by the Examiner

UNITED STATES PATENTS

| | | | |
|---|---|---|---|
| 2,856,440 | 10/1958 | Wolff | 260—653.1 |
| 2,931,840 | 4/1960 | Marquis | 260—653.3 |

OTHER REFERENCES

Haszeldine: J. Chem. Soc. 1952, 2504–2513.

Hauptschein et al.: J. Am. Chem. Soc. 79, 2549–2553 (May 1957).

LEON ZITVER, *Primary Examiner.*

DANIEL D. HORWITZ, *Examiner.*